United States Patent
Gaebel et al.

(10) Patent No.: US 7,343,627 B2
(45) Date of Patent: Mar. 11, 2008

(54) SECURE DOCUMENT-DATA-HANDLING SYSTEM AND METHODOLOGY

(75) Inventors: Gary Lin Gaebel, Vancouver, WA (US); Sara Lynn Leslie, Washougal, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 826 days.

(21) Appl. No.: 10/135,969

(22) Filed: Apr. 29, 2002

(65) Prior Publication Data

US 2003/0204747 A1 Oct. 30, 2003

(51) Int. Cl.
*G06F 17/30* (2006.01)

(52) U.S. Cl. .............................. 726/27; 726/26; 726/2; 726/16; 713/193; 713/182

(58) Field of Classification Search ............ 726/26–30, 726/2, 6; 358/1.1, 400, 55, 1.14–1.15, 434, 358/464; 705/57, 58, 18; 709/246, 201, 709/211, 216, 220, 225, 229, 226; 360/60; 711/163, 100; 400/76; 355/133; 713/182, 713/189, 193; 380/55, 201
See application file for complete search history.

(56) References Cited

U.S. PATENT DOCUMENTS

| | | | |
|---|---|---|---|
| 4,603,970 A | 8/1986 | Aota et al. | |
| 4,739,377 A | 4/1988 | Allen | |
| 4,894,805 A * | 1/1990 | Godshalk et al. | 365/222 |
| 5,077,795 A * | 12/1991 | Rourke et al. | 380/55 |
| 5,964,851 A * | 10/1999 | Ueda | 710/17 |
| 5,982,956 A | 11/1999 | Lahmi | 382/306 |
| 5,987,127 A | 11/1999 | Ikenoue et al. | 380/7 |
| 6,085,323 A | 7/2000 | Shimizu et al. | 713/201 |
| 6,314,409 B2 | 11/2001 | Schneck et al. | 705/54 |
| 6,330,648 B1 * | 12/2001 | Wambach et al. | 711/163 |
| 6,654,864 B2 * | 11/2003 | Shaath et al. | 711/163 |
| 6,813,682 B2 * | 11/2004 | Bress et al. | 711/112 |
| 6,961,936 B2 * | 11/2005 | Bhatti | 718/102 |
| 2002/0023225 A1 | 2/2002 | Lomnes | 713/200 |
| 2002/0032703 A1 * | 3/2002 | Gassho et al. | 707/527 |
| 2002/0083114 A1 * | 6/2002 | Mazzagatte et al. | 709/100 |
| 2002/0169985 A1 * | 11/2002 | Purpura | 713/201 |
| 2003/0079078 A1 * | 4/2003 | Zipprich et al. | 711/112 |

* cited by examiner

*Primary Examiner*—Thanhnga Truong
*Assistant Examiner*—Nirav Patel
(74) *Attorney, Agent, or Firm*—Jon M. Dickinson, PC; Robert D. Varitz, PC

(57) ABSTRACT

The method and system which assure tight security over access to document data which is being handled in a system during scanning, copying, printing and faxing modes of operation. Security takes place with (1) substantially complete blockage of outside-world (network, telephone line) access to such data during the handling time, (2) prevention of any data writing to a hard-drive memory device, and (3) job-completion destruction of any data temporarily stored in a random access memory, before there is any post-job restoration to outside-world connectivity.

6 Claims, 2 Drawing Sheets

SECURE DOCUMENT-DATA-HANDLING SYSTEM AND METHODOLOGY

BACKGROUND AND SUMMARY OF THE INVENTION

This invention related to secure handling of document data with respect to a document-handling job which is going to be performed by and with respect to a device, such as a so-called multi-function peripheral (MFP) device. In particular, it relates to a system and to a methodology whereby access to document data during a document-handling job, and after completion of that job, is effectively closed-off to the outside world, as via a network or telephone line connection, and whereby all document data which may have been stored in memory structure in the device is completely destroyed/removed at the end of the job, and before there is any restoration of connectivity of the device to the outside world.

For the purpose of illustration herein, a preferred embodiment and manner of practicing the invention are described in relation to an MFP device, though it should be clearly recognized that the features of the invention may be employed with other specific types of equipment capable of carrying out one or more of the functions typically offered by an MFP device.

When printing, network scanning, copying or faxing a confidential document, it is desirable to leave no trace of the document behind. For example, employee performance evaluations, grievances, and sensitive attorney-client privileged documents typically handled by human resources and legal departments in corporations may create a liability for a corporation if these documents are left behind on a copier, or in the copier's memory, or can be remotely accessed surreptitiously during a time that a document-handling job is being performed in conjunction with such material.

By contribution of the system and methodology of the present invention, and according to a preferred manner of implementing the invention, at the site of a device, such as an MFP device, a user of that device with respect to document handling is presented with an option to elect to work with that document in a secure operating (document-handling) mode. Such a selection can be performed, for example, by pressing a user-interface button on the outside surface of the device, or by clicking on or otherwise accessing a virtual, user-interface operating button presented on the screen of the device. Selection of a secure operating mode causes a disconnection to take place between the MFP device and the outside world with respect to most physical connections and communications that may exist with a network and/or with a telephone line. This disconnection, referred to herein as a step involving preemptive narrowing of the prospective scope of access, is done in such a fashion that no unauthorized access can be gained to document data, but that if some communications are necessary over a network or a telephone line as a direct requirement, say, of a particular printing job, related features of such a network and line are allowed to remain accessible to the user. Such a disconnection also is not necessarily one which blocks all kinds of network communications, for example, relatively low-level communications such as Ping communications.

Implementation of a secure operating mode during a print job also prevents any document data from being stored on a hard-drive device which may form part of the memory structure of such an MFP device. Random access memory which may capture and store document data during performance of a document-handling job is erased on completion of a job, and before there is any restoration of normal connectivity to a network, a phone line, etc.

The various features and performance advantages that are offered by the present invention will become more fully apparent as the description which now follows is read in conjunction with the accompanying drawings.

DETAILED DESCRIPTION OF THE INVENTION

Figure 3:
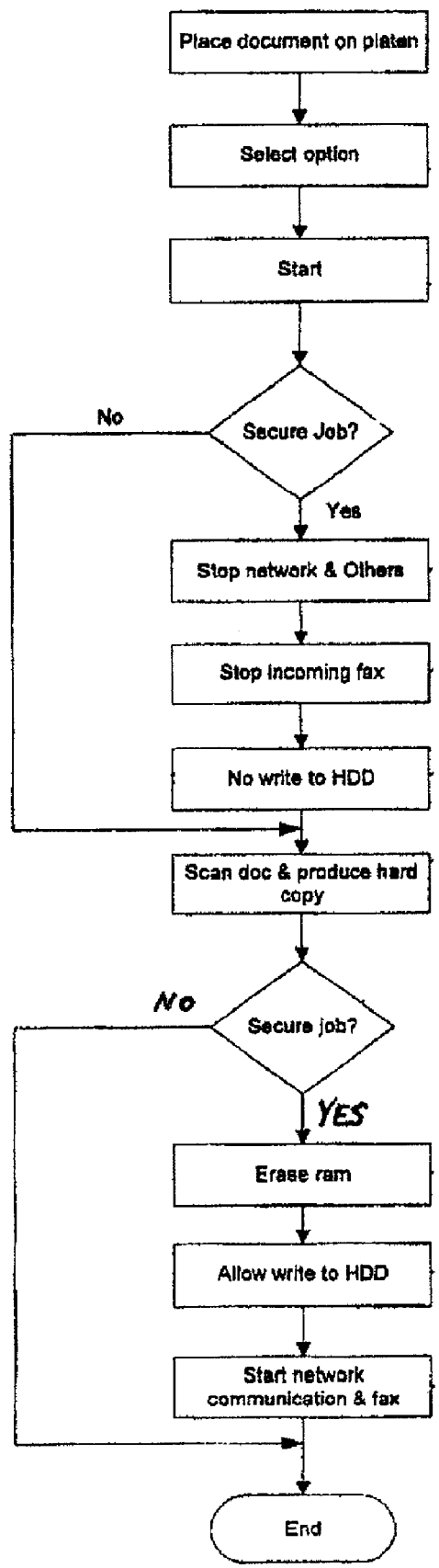
FIG. 3 is a block/flow diagram illustrating specifically the operation of the system and methodology of this invention with respect to the carrying-out of a copying job which has been initiated in the MFP device of FIGS. 1 and 2. This singular diagram functions additionally as a fully descriptive and enabling model of operation of the invention in relation to the carrying out of functions (discussed herein) other than copying.

As was suggested above, and for the purpose of illustration herein, only one of the several different types of document data-handling tasks with respect to which a secure operating mode can be implemented in accordance with the present invention, namely, a copying job, is expressly laid out in the flow/schematic diagram, FIG. 3. From what is presented in this drawing figure with respect to copying, taken along with the descriptive materials which are given below, it will be very apparent to those skilled in the art how similar schematic/flow diagrams would be constructed to represent operations of the invention in relation to other document-handling tasks, such as scanning, printing and faxing.

Figure 1:
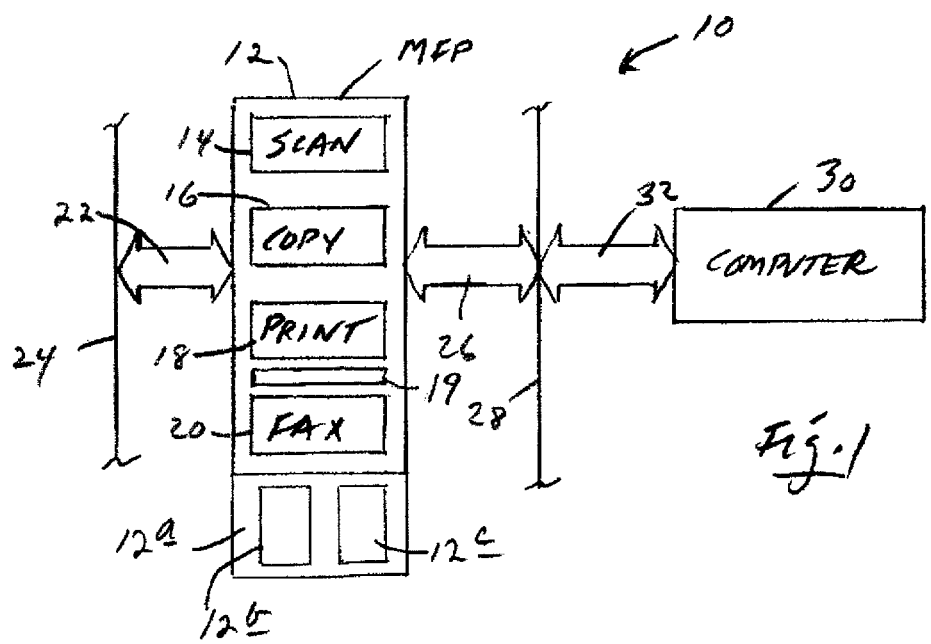
FIG. 1 is a block/schematic diagram of a system including an MFP device, a computer, a network, and a telephone line connection, all connected and operating in accordance with the present invention.

Accordingly, and turning now first of all to FIG. 1, indicated generally at 10 is one form of a system which embodies and operates in accordance with the present invention. Included in system 10, as presented in FIG. 1, is a multi-function peripheral (MFP) device, or machine structure, 12 which includes within it appropriate structure, firmware and software capable of performing scanning, copying, printing and faxing. The portions of device 12, which function as performance structures for scanning, copying, printing, and faxing, are shown, respectively at 14, 16, 18, 19, 20. Portion 14 is also referred to herein as a scanner, portion 16 as structure enabling copying, portion 18 as a print controller, portion 19 as a marking engine, and portion 20 as structure enabling faxing.

Also included in MFP device 12 is an appropriate memory structure 12a which, herein, includes a hard-drive device 12b, and a random access memory portion 12c. As will be discussed more fully below, during operation of the system and method of this invention, no document data is permitted to be sent to and stored on the hard-drive device. Any such data which needs to be stored is stored in random access memory portion 12c, and this data is appropriately destroyed upon completion of a print-job wherein the invention has been invoked.

It should be mentioned at this point herein that while an MFP (numbered 12) is specifically illustrated in FIG. 1, this is done symbolically to represent any machine at such a location in system 10 which is capable of performing any one or more of the four specific functionalities represented in MFP device 12. Device 12 is connected through a data connection 22 to a telephone line, shown fragmentarily at 24, and through a data connection 26, to a local and/or broad-area network, represented by fragmentary line 28. Lines 24,28 are also referred to herein as external communication structure.

Shown at 30 in FIG. 1 is a computer which, through a data connection 32, is also connected to network line 28.

Figure 2:
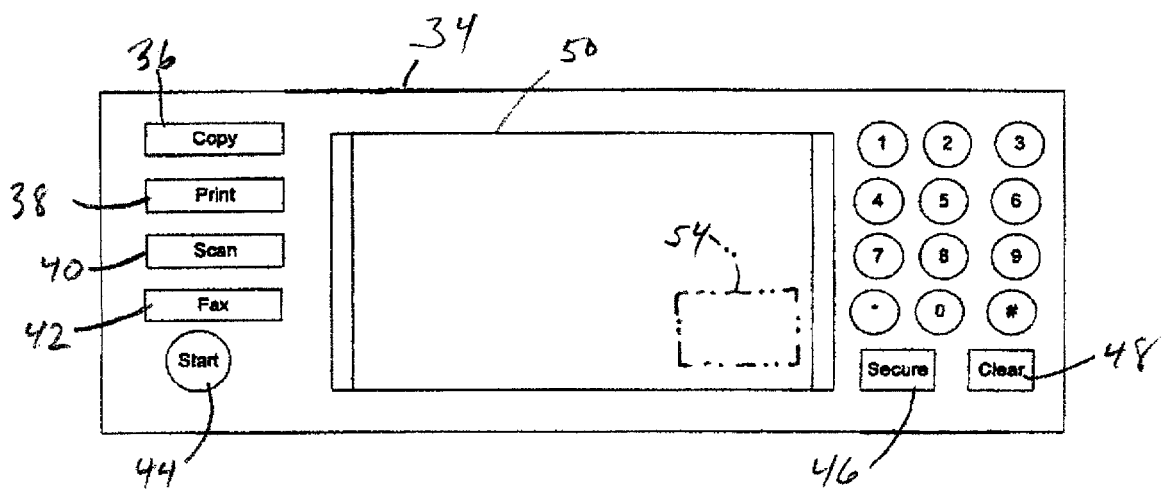
FIG. 2 is a representative layout of a user interface (both hard and virtual) in the MFP device of FIG. 1, and specifically an interface which affords an opportunity for a user of the MFP device to enter a secure document-handling operating mode with respect to a particular document-handling job or operation.

Shown at 34 in FIG. 2 is a panel which, herein, constitutes a hard user interface in and with respect to MFP device 12. This interface includes, as illustrated, four activation buttons marked "Copy", "Print", "Scan", and "Fax", respectively numbered 36, 38, 40, 42. Also included in interface 34 are a "Start" button 44, a "Secure" button 46, and a "Clear" button 48. Button 46 is also referred to herein as security-implementing structure. Button 48 functions as a manual security-disengagement structure under circumstances where a user wishes to discontinue a security-mode operation midstream, and to effect immediate clearance of all sensitive memory data.

Further included in interface 34 in the particular MFP device now being described, is a display screen 50. A dash-double-dot rectangle 52 which appears on screen 50 has been placed there to indicate that any one or more of the control buttons 36-48, inclusive, could be represented as virtual interface buttons on screen 50.

According to the invention, and mentioning here briefly several different kinds of activities which can take place in system 10 with respect to MFP device 12, a user can implement and initiate any one of four different kinds of operations, including scanning, copying, printing, and faxing. With respect to each and every one of these operations, the user can invoke what is referred to herein as security response structure to establish a secure document-handling mode of operation according to the invention.

Beginning with a general discussion of a scanning operation, such an operation can be implemented at the site of device 12 for the purpose, for example, of transmitting the contents of a document outwardly from MFP device 12 through either one of data connections 22 or 26. Such an operation is initiated by a user placing a document in the scanner in device 12, which then scans the document, and perhaps places the extracted document data somewhere within memory structure 12a, from which structure the document data may be transmitted outwardly over data connections like those shown at 22, 26.

During the time when document data is being scanned in, an unauthorized access to that data could take place via someone connecting to MFP device 12 through either one, for example, of data connections 22, 26. Further, if the particular scanning operation which is implemented in fact results in document data contents becoming stored in memory structure 12a, it is possible that, after the job is complete, data might still be there for an unknown period of time, and might be accessible by an unauthorized person.

In the case of copying, a typical copying operation is one which involves a preliminary scanning operation to bring in document data, followed by storage of some or all of the data typically in memory structure 12a, and thereafter followed by printing of a hard copy of the data employing the MFP device's marking engine 19.

During such a copying operation, and after completion of that operation, the very same kinds of risks of unauthorized access just mentioned above with respect to a scanning operation are also present.

Similarly, during a faxing operation, and considering an outgoing faxing operation, a document to be facsimilied is scanned, with data drawn from the document perhaps memorized within memory structure 12a, and then transmitted over data connections, like data connections 22, 26.

It will be apparent that in this operation too, similar non-security conditions exist with respect to possible access to document data during the time that the document data is being processed during intake and faxing, and after completion of a faxing operation. If any remnants of document data are left in memory structure 12a.

Two other kinds of typical operating situations should also be generally considered. One involves receipt by device 12 of an incoming command initiated in a remote computer, such as computer 30, to print a document. In this type of operation, data comes in to MFP device 12, not through operation of its scanner, but rather, in the particular illustration now being given, via data connection 26 which is connected to network 28. The other, somewhat related operating situation involves receipt by device 12 of an incoming facsimile transmission over data structure 22. Here also, data relating to a document enters device 12, not through internal scanning, but rather from the outside world over data connection 22.

In both of these situations which involve document data entering device 12 from the outside world, so-to-speak, during the time that that data is being received and processed in device 12, unauthorized access to get at that data could take place. Also, if in either of these two illustrations of incoming data some or all of that data is stored in memory structure 12a, then, after completion of the particular activity involved, remnant data contents could still be present in the memory structure and accessed by an unauthorized person.

The present invention affords a way to increase significantly the security relative to document data access in all of the above-described activities. Fundamentally, what the system and methodology of the present invention accomplish is that, during handling of data internally within device 12, all "risky" connections to the outside world, as through data connections 22, 26, are completely closed off and blocked (disconnected), except in those certain instances where outside-world connections need to be maintained at a certain minimal level for the very purpose of executing and completing a document-handling job, or for permitting certain low-level types of communication as mentioned earlier. Under these circumstances, the system and methodology of the invention, as a first level of security defense, essentially limit connectivity to the sensitive document data to only that which is necessary to implement the job particulars per se. In the other described situations which do not involve data flowing into device 12 from the outside world, effectively all potentially troublesome network and telephone line connections are completely disconnected during the time that device 12 is operating on or receiving document data from whatever source, typically internal scanning.

Secondly, operation and practice of this invention, when employed, results in a complete blockage within device 12 of the transmission of document data to, and storage of that data on, hard-drive device 12b. The only memory structure which is made accessible for internal use during this time is the random access memory 12c.

At the conclusion of a particular document-handling job, and before restoration occurs with respect to outside world connections, as through data connections 22, 26, all document data which has been stored within random access memory structure 12c is effectively erased, either by an appropriate random write-over of data, or perhaps by a momentary, controlled, power-down operation which causes the random access memory to "lose" the intelligence of its contents. This operation occurs automatically, and under the control of appropriate security-disengagement structure furnished according to implementation of the present invention.

FIG. 3 in the drawings schematically, and in a logical flow-chart manner, illustrates a document-handling job which involves copying. Thus, it involves scanning in of document data by scanner 14, and perhaps some memorization of data within random access memory 12c followed by printing of a hard copy utilizing marking engine 19. A user under these circumstances wishing to utilize the document data security mode offered by the present invention, presses the "Secure" button which is made available on interface 34, or presses the equivalent "Secure" button made available virtually on the screen in the user interface. Activation of this button by user selection then places device 12 in a secure operating mode, causing (a) disconnection to occur from the outside world, (b) prevention of the recording of data on hard-drive device 12b and (c) staging of device 12 to create an automatic erasure of all memory contents in the random access memory after completion of the job. Legends provided on the blocks and diamonds which make up the diagram of FIG. 3 clearly describe this operation. As was stated earlier herein, a reading of FIG. 3 in light of the general descriptions which have just been given, makes the operation of copying a document in a secure mode according to the invention entirely understandable.

Those skilled in the art, on reviewing the flow diagram presented in FIG. 3, along with the descriptions which have been given above respecting the various document-handling operating modes in which security can be implemented, will plainly understand how to construct, if such is desired, a logical flow diagram like that presented in FIG. 3 but relevant to the other, several, specific document-handling operations which have been discussed above.

Accordingly, the invention offers a very simple, reliable, and secure manner of protecting the integrity and the security of document data being handled in and during the kinds of document-handling operations that have just been described with respect to MFP device 12. Implementation of the invention results in a scope-narrowing condition wherein outside access to document data is strictly limited, creates a condition wherein data access to a hard-drive device is fully blocked, and sets the stage whereby any memorized data is destroyed either automatically, or manually by a user, after a job has been completed. Regarding the issue of outside-world access, during the time that job activity is under way, and that data is being processed within device 12, remote access from the outside world through data connections, such as connections 22. 26 shown in FIG. 1, is substantially completely closed off, insofar as any potential unauthorized access to sensitive data is concerned. The only circumstances where this is not true are those in which a minimal level of outside-world connectivity needs to be retained in order to complete a particular job, such as faxing, or can be permitted without a data-access risk, such as Pinging.

A convenient user interface which is provided directly on a device, such as device 12, allows for simple user selection of the "Secure" operation mode. In cases where data is being transmitted to a device like device 12 for processing from a remote location, such as from computer 30, the invention contemplates that an appropriate driver, for example, for a device like device 12 presents a user interface on the monitor screen connected to such a computer, offering the document transmitter the option to send a command which will place device 12, or the like, in a secure operating mode. At the completion of a job, memory erasure takes place automatically. Manual erasure can be exercised, using a real or virtual interface button, such as button 48, in the event that the user wishes to terminate a security-mode task before it has been completed. Only after memory erasure takes place is full connectivity restored to the outside world.

The system and methodology of the invention have been described in conjunction with a preferred embodiment wherein (a) a user selects a secure operating mode which functions as above described, and (b) on completion of a job, there is an automatic erasure of memory. It is possible of course to implement a system which employs the invention wherein a machine, such as device 12, operates essentially entirely within a default mode which is always a secure operating mode. In such an instance, the device employed could selectively be removed from a secure operating mode when it is necessary and desirable to allow it to communicate with the outside world.

Accordingly, while a preferred invention embodiment and practice, and certain variations thereof, have been illustrated and described herein, it is appreciated that other variations and modifications are possible without departing from the spirit of the invention.

We claim:

1. A hard-drive, document-task-data, storage-avoiding non-retention method for the secure handling of document task data in a computer work environment in relation to the performance of a task, or tasks, (1) relating to such data, and (2) involving at least one of the functions including (a) scanning, (b) copying, (c) printing, and (d) faxing, and wherein, with regard to performance of such a task, there is a user interface through which the task is initiated and implemented by a user, and memory structure which may receive, and, during task performance only, random-access store, at least a portion of such data as a consequence of such initiating and implementing of the task, said method comprising prior to document-data introduction into that environment, preemptively narrowing the prospective scope of permitted outside access and inter-engagement which will be permitted to such data during the time when that data will be entered and present in the environment, so as to limit such access and inter-engagement substantially solely to direct local implementation of the user-selected task(s), and to no other external influence, said narrowing selectively including disconnectively isolating the computer work environment in a partial-only manner relative to any flow of task data between that environment and the outside world, with said partial-only isolating being defined by blocking such document data from any access to hard-drive storage without blocking other access to the hard drive, introducing the data into the narrowed-access environment, implementing the selected task(s), upon completion of the task(s) implementation(s), preventing any task-data retention through ridding the environment of any memory-structure data-content related to the just-completed task(s), and after said ridding, disengaging the environmental scope-narrowing which was earlier created.

2. The method of claim 1, wherein said preemptive narrowing is effected via user selection performed at the location of the mentioned user interface.

3. The method of claim 2, wherein user selection is implemented by a hardware device made available to the user at the site of the mentioned user interface.

4. The method of claim 2, wherein user selection is implemented by a virtual input device presented to the user at the site of the mentioned user interface.

5. A system for implementing a method for the secure handing of document data in a computer work environment in relation to the performance of a task, or tasks, relating to such data, and wherein, within the system, there is machine structure enabling user selection, initiation and implementation of such a task, or tasks, involving at least one of the functions including (a) scanning, (b) copying, (c) printing, and (d) faxing, and wherein, with regard to the performance of such a task, or tasks, there is also included in the system a user interface which is operatively connected with the just-mentioned machine structure, through which interface the task, or tasks, is/are initiated and implemented by a user, said system comprising, security-implementing structure operable, at a point in time prior to the introduction of document data into the system, to place the system preemptively into a state of being which narrows the prospective scope of permitted access and inter-engagement which will be allowed to such document data during the time when that data will be entered and present in the system, so as to limit such access and inter-engagement substantially solely to direct implementation of the user-selected task(s), and to no other external influence with such placing including disconnectively isolating the computer work environment in a partial-only manner relative to any flow of task data between that environment and the outside world, with said partial-only isolating being defined by blocking such document data from any access to hard-drive storage without blocking other access to the hard drive, and automatic security-disengagement structure operable, on the completion of a user-implemented and now performed task(s), to disengage the system from the preemptively narrowed scope of access and inter-engagement condition mentioned above, so as to leave the system, after such disengagement, in a non-document-data-retention condition containing no trace of document data associated with the just-completed task(s).

6. The system of claim 5, wherein there is provided a connection to an external communication structure, such as a network and/or a telephone line, and the act of narrowing the scope of access and inter-engagement in the system during the implementation of a user-selected task, or tasks, additionally involves denying any access to document data associated with that task, or tasks, over such external communication structure.

* * * * *